(No Model.) 2 Sheets—Sheet 1.
C. T. STETSON.
MACHINE FOR CHANNELING AND TRIMMING SOLES.
No. 288,377. Patented Nov. 13, 1883.
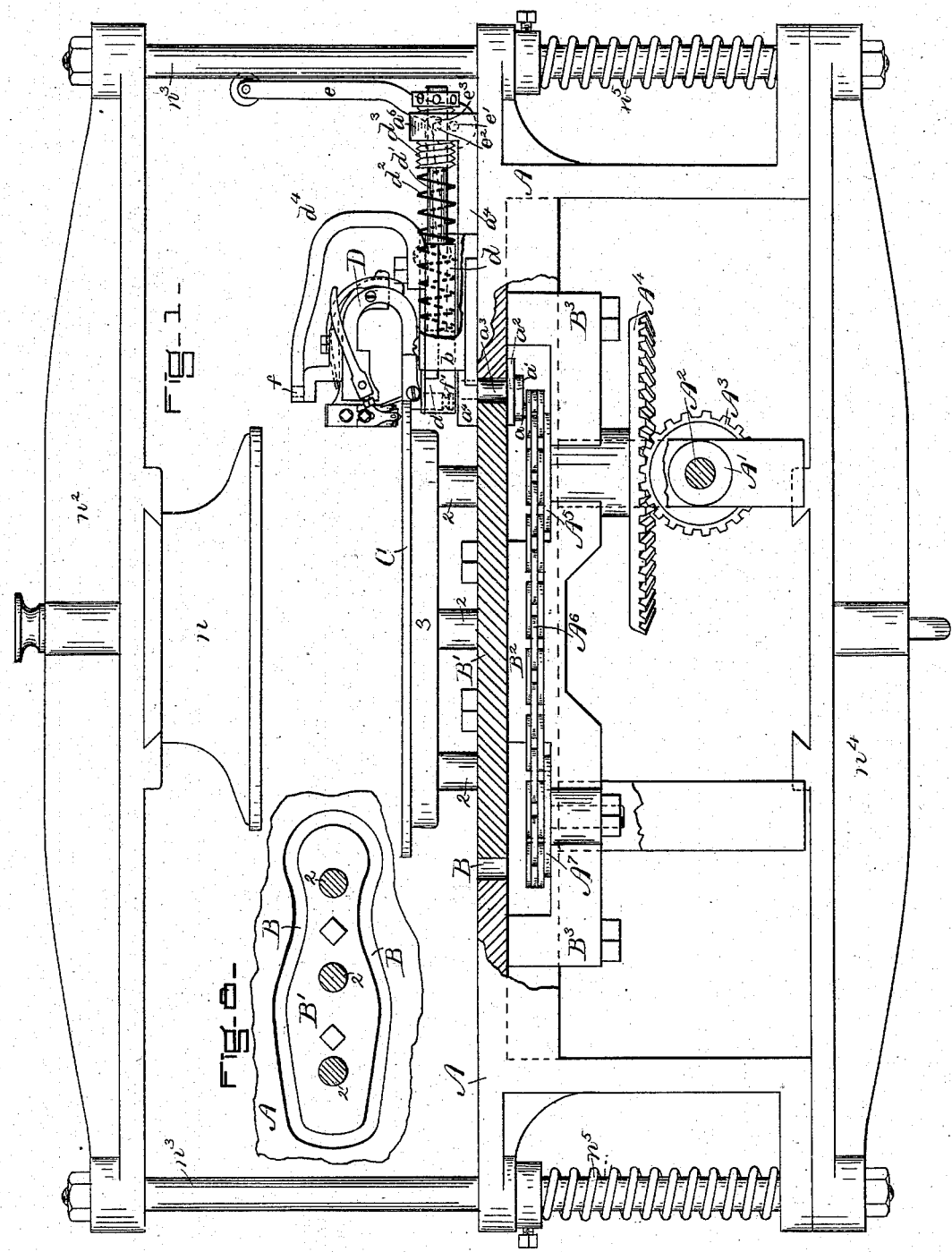
WITNESSES
A. O. Owen
Fred A. Powell
INVENTOR
Charles T. Stetson
by Crosby & Gregory
Attys.

(No Model.) 2 Sheets—Sheet 2.
C. T. STETSON.
MACHINE FOR CHANNELING AND TRIMMING SOLES.
No. 288,377. Patented Nov. 13, 1883.
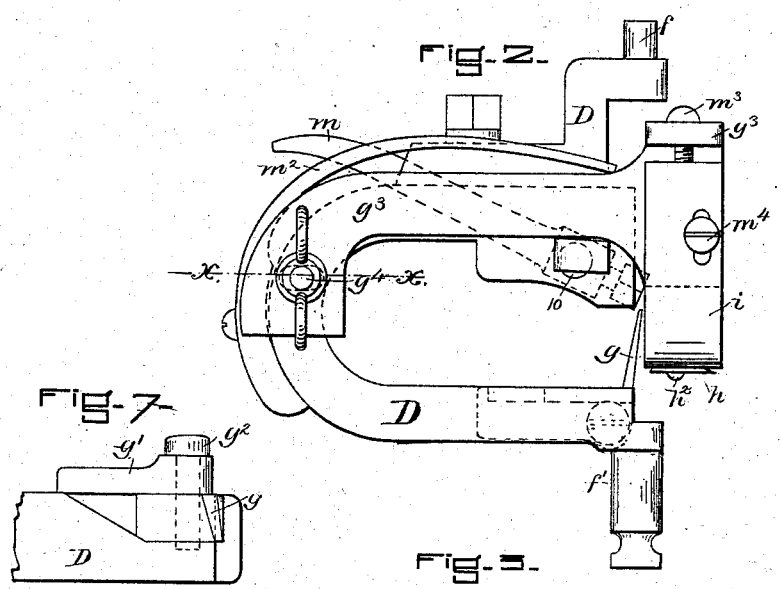
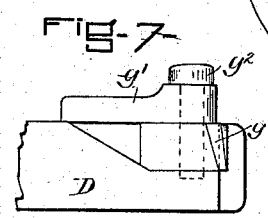
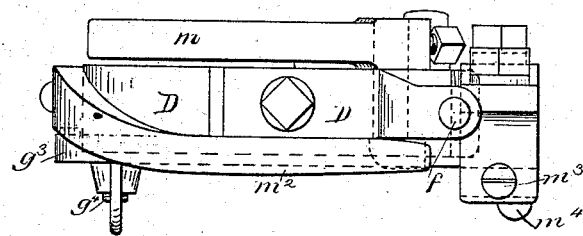
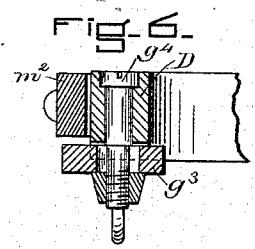
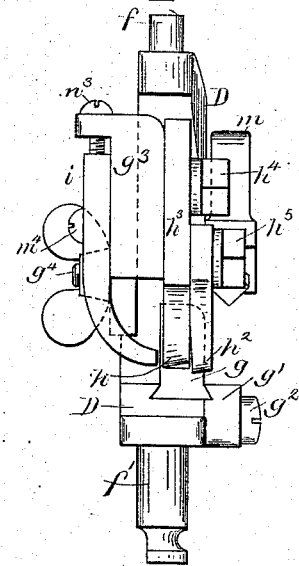
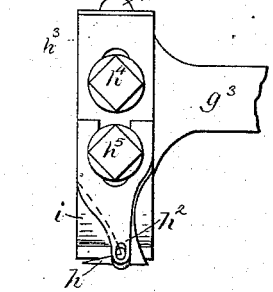
WITNESSES
A. O. Orne
Fred A. Powell
INVENTOR
Charles T. Stetson
By Crosby & Gregory
Attys.

UNITED STATES PATENT OFFICE.

CHARLES T. STETSON, OF ROCKLAND, MASSACHUSETTS, ASSIGNOR TO THE NATIONAL WATERPROOF SHOE COMPANY, OF MAINE.

MACHINE FOR CHANNELING AND TRIMMING SOLES.

SPECIFICATION forming part of Letters Patent No. 288,377, dated November 13, 1883.

Application filed March 19, 1883. (No model.)

*To all whom it may concern:*

Be it known that I, CHARLES T. STETSON, of Rockland, county of Plymouth, State of Massachusetts, have invented an Improvement in Machines for Channeling and Trimming Soles, of which the following description, in connection with the accompanying drawings, is a specification, like letters on the drawings representing like parts.

This invention has for its object the production of a machine by which to simultaneously channel and trim a sole in accordance with a pattern, and the machine is also arranged to groove the channel.

My invention consists, essentially, in a pattern-plate and means to hold a piece of leather to be formed into a sole, and a carriage provided with a channeling and edge-trimming device, combined with an endless chain or flexible connection to carry the said carriage about the pattern.

Figure 1 in side elevation and partial section represents a sole channeling and trimming machine embodying my invention, the same being also adapted to groove the channel; Fig. 2, a side elevation, enlarged, of the holder for the knives to be described; Fig. 3, a top view thereof; Fig. 4, a view of the right-hand end of Fig. 2; Fig. 5, a detail of the channel knife and groover; Fig. 6, a section on the dotted line $x$ $x$, Fig. 2; Fig. 7, a detail showing a part of the holder and its attached edge-trimming knife; and Fig. 8, a diagram on a small scale, showing the shape of the slot in the top plate of the machine.

The frame-work A has a suitable bearing, A′, to receive the main driver-shaft A², provided with a bevel-gear, A³, which engages a large bevel-gear, A⁴, on the lower end of an upright shaft, provided with a sprocket-wheel, A⁵, which receives about it a chain or flexible connection, A⁶, that is extended over a second sprocket-wheel, A⁷. The horizontal upper plate of the frame has a slot, B, shaped as shown in the diagram, Fig. 8, leaving a central detached part, B′, which is sustained by the W-shaped bracket B² B³, attached to the framework A. This endless traveling chain or connection A⁶ has a pin, $a$, attached to one of its links, and the said pin has an arm or crank, $a′$, which in turn is provided at its other end and upper side, as in dotted lines, Fig. 1, with a pin, which enters a plate, $a²$, fast on the lower end of a pin, $a³$, extended through the slot B, and connected with the lower end of the carriage-bed $a⁴$, resting on the bed of the frame A. The plate B′ has several posts, 2, terminated at top by a bar, 3, to which is adjustably attached the sole-pattern C, on which the piece of leather to be trimmed and channeled rests. The carriage-bed and its parts, to be described, are carried about the pattern-plate by the chain A⁶.

The carriage-bed $a⁴$ has upright side walls, $b$, only one of which is shown in Fig. 1, and it is partially broken out, between which, in suitable ways, is placed a carriage, $d$, so that the latter may slide backward and forward therein. The carriage $d$ has a rod, $d′$, extended backward through a spiral spring, $d²$, and an adjustable hollow nut, $d³$, held in an ear, $a⁵$, of the carriage-bed $a⁴$.

The lever $e$, pivoted on the ear $a⁵$ at $e′$, has a pin, $e²$, which engages a hook of a hooked rod, $e³$, attached to the carriage, and by turning the lever toward the right from its position Fig. 1 the carriage may be drawn backward away from the pattern-plate against the pressure of the spring $d²$. The carriage has an attached overhanging arm, $d⁴$, which receives the upper pivot, $f$, of the knife-holding frame D, the lower pivot, $f′$, of which enters a socket in the carriage, as shown in dotted lines, Fig. 1. The spring $d²$ acts to press the pivoted knife-holding frame D against the edge of the pattern-plate C, and the said frame turns more or less in the said carriage as the latter is carried about the pattern-plate.

The base of the edge-trimming knife $g$ is adjustably held in the frame D by a grooved plate, $g′$, and a screw, $g²$. The part $g³$ of the frame D, (shown as pivoted thereon at $g⁴$,) carries the channel-cutting knife $h$, and the groover $h²$, and the presser-foot $i$. The shank $h³$ of the knife $h$ is adjustably fastened to $g³$ by the bolt $h⁴$, and the groover $h²$ by the bolt $h⁵$, and the presser-foot is made adjustable by the screws $m³$ and $m⁴$. The arm $g³$ is kept pressed down with the presser-foot against the face of the sole being channeled by a spring, $m²$, and the said frame is adapted to be lifted to remove the presser-foot from the said sole by the hand-lever m, pivoted at 10.

In practice the connection of the arm $g^3$, which carries the channeling-knife $h$ and grooving-knife $h^2$, with the knife-holding frame D is such as to permit the said arm $g^3$ to be adjusted horizontally to vary the width or distance of the channel back from the edge of the sole. In my United States Patent No. 263,616 I have shown a lever by which the adjustment can be quickly made, and herein I may, if desired, employ such a lever and parts as therein shown to adjust the channel-knife horizontally.

The piece of leather to be cut into sole shape and channeled will be held down upon the pattern-plate C by the holder $n$, adjustably connected with the cross-head $n^2$, mounted on the rods $n^3$, guided in suitable ways of the framework A, and attached at their lower ends to a cross-bar, $n^4$, which will have connected with it in any usual way a suitable treadle by which to depress the cross-head $n^2$. The springs $n^5$ act to elevate the cross-head in the position Fig. 1.

I claim—

1. The pattern-plate, an endless belt or flexible connection, the carriage-bed connected to and made movable with the said belt about the pattern-plate, and the carriage D, combined with a knife-holding frame pivoted in the said carriage, and provided with a channel-knife and an edge-trimming knife, to operate substantially as described.

2. The horizontally-adjustable channel-knife and groover, the arm $g^3$ to carry them, the edge-trimming knife, the pivoted knife-holding frame, the carriage, and the carriage-bed in which the carriage is adapted to slide toward and from the pattern-plate, combined with the stationary pattern-plate, the endless chain or connection with which the said carriage-bed is connected, and with means to move the said chain, substantially as and for the purposes set forth.

In testimony whereof I have signed my name to this specification in the presence of two subscribing witnesses.

CHARLES T. STETSON.

Witnesses:
G. W. GREGORY,
B. J. NOYES.